United States Patent
Qi et al.

(10) Patent No.: US 7,392,037 B2
(45) Date of Patent: Jun. 24, 2008

(54) WIRELESS COMMUNICATION DEVICE AND METHODS FOR PROTECTING BROADCASTED MANAGEMENT CONTROL MESSAGES IN WIRELESS NETWORKS

(75) Inventors: Emily H. Qi, Portland, OR (US); Jesse R. Walker, Portland, OR (US); Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 392 days.

(21) Appl. No.: 11/208,426

(22) Filed: Aug. 19, 2005

(65) Prior Publication Data

US 2007/0060043 A1 Mar. 15, 2007

(51) Int. Cl.
*H04M 1/66* (2006.01)
*H04K 1/00* (2006.01)
*H04L 9/00* (2006.01)

(52) U.S. Cl. .................. 455/410; 455/411; 380/247; 380/270; 713/168; 713/170

(58) Field of Classification Search ........... 455/410, 455/411; 380/247, 270; 713/168, 170
See application file for complete search history.

(56) References Cited

U.S. PATENT DOCUMENTS

| | | | | |
|---|---|---|---|---|
| 5,237,612 A | * | 8/1993 | Raith | ............... 380/247 |
| 6,108,424 A | * | 8/2000 | Pitiot | ............... 380/270 |
| 6,198,823 B1 | * | 3/2001 | Mills | ............... 380/247 |
| 6,856,800 B1 | * | 2/2005 | Henry et al. | ............... 455/411 |
| 7,009,940 B2 | * | 3/2006 | Vialen et al. | ............... 370/252 |
| 2003/0135762 A1 | * | 7/2003 | Macaulay | ............... 713/201 |
| 2005/0026596 A1 | * | 2/2005 | Markovitz | ............... 455/411 |
| 2005/0207581 A1 | * | 9/2005 | Qi et al. | ............... 380/270 |
| 2005/0262418 A1 | * | 11/2005 | Gehrmann | ............... 714/758 |
| 2005/0278548 A1 | * | 12/2005 | Lin et al. | ............... 713/189 |
| 2006/0262932 A1 | * | 11/2006 | Sood et al. | ............... 380/272 |
| 2006/0288204 A1 | * | 12/2006 | Sood et al. | ............... 713/161 |
| 2007/0118649 A1 | * | 5/2007 | Sills et al. | ............... 709/225 |

FOREIGN PATENT DOCUMENTS

EP 0898216 A2 2/1999

OTHER PUBLICATIONS

"Satellite Earth Stations and Systems (SES)", *European Telecommunications Standards Institute*, vol. SES-BSM (VIII), (May 2004).

* cited by examiner

*Primary Examiner*—Duc M. Nguyen
(74) *Attorney, Agent, or Firm*—Schwegman, Lundberg & Woessner, P.A.; Gregory J. Gorrie

(57) ABSTRACT

Embodiments of wireless communication devices and methods for protecting broadcasted management control messages from insider forgery in wireless network are generally described herein.

35 Claims, 3 Drawing Sheets

WIRELESS COMMUNICATION DEVICE AND METHODS FOR PROTECTING BROADCASTED MANAGEMENT CONTROL MESSAGES IN WIRELESS NETWORKS

TECHNICAL FIELD

Some embodiments of the present invention pertain to wireless communications. Some embodiments pertain to wireless networks, such as wireless local area networks (WLANs).

BACKGROUND

In many wireless networks, a managing communication station, such as an access point, may broadcast network management and control messages as well as other information, to associated communication stations. These broadcasted messages may request that the associated communication stations perform some type of network management and/or control function. One problem is that these network management and control messages may not have originated from the access point and may have been forged by one of the associated communication stations. These forged messages may cause many different network management problems, which may for example, reduce network performance and increase power consumption and can lead to denial of service situations.

Thus, there are general needs for systems and methods that protect broadcasted management control messages in wireless networks. There are also general needs for systems and methods that also detect and recover from the transmission of forged broadcasted messages in wireless networks.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

Figure 1:
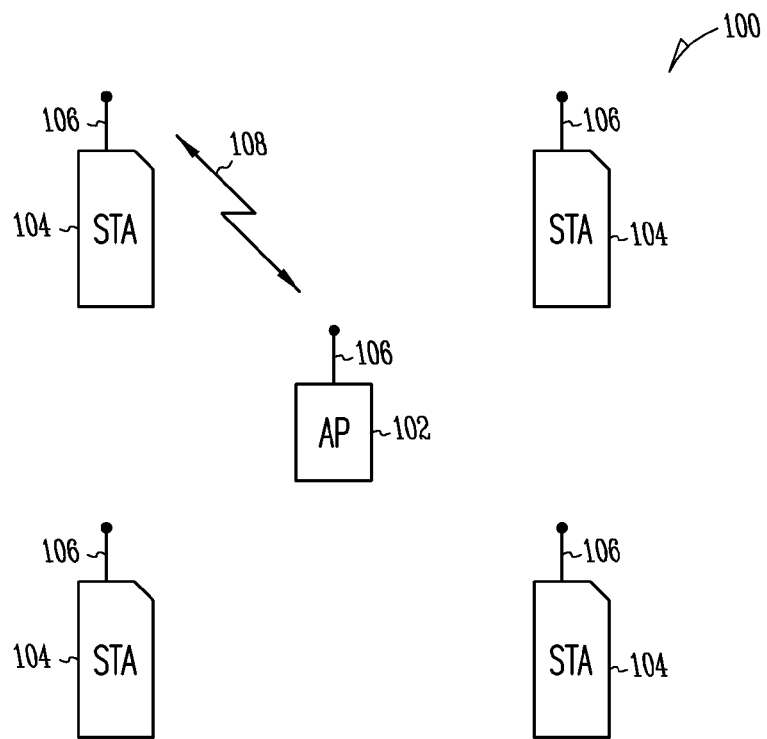
FIG. 1 illustrates a wireless communication network in accordance with some embodiments of the present invention.

FIG. 1 illustrates a wireless communication network in accordance with some embodiments of the present invention.

Wireless communication network 100 includes a managing communication station, such as access point (AP) 102, and one or more associated communication stations (STAs) 104. In some embodiments, communication signals are transmitted between access point 102 and communication stations 104 allowing communication stations 104 to communicate with each other through access point 102, as well as allowing communication stations 104 to communicate with other networks, such as the Internet, through access point 102. In some embodiments, network 100 may be a wireless local area network (WLAN) and may operate in accordance with one or more of the IEEE 802.11 or 802.16 standards referenced below, although the scope of the invention is not limited in this respect. Access point 102 and communication stations 104 may utilize antennas 106 to transmit and receive the communication signals.

Figure 2:
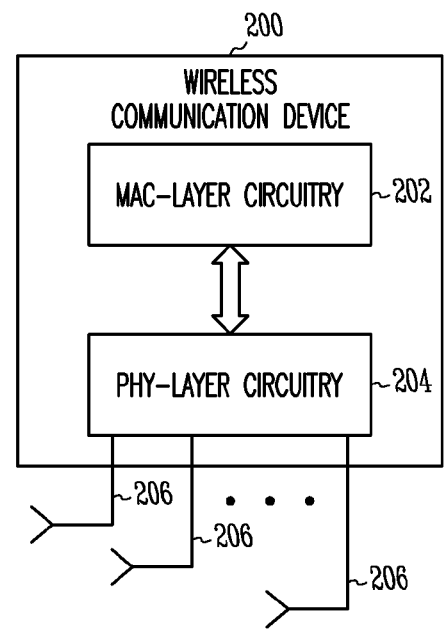
FIG. 2 is a functional block diagram of a wireless communication device in accordance with some embodiments of the present invention.

FIG. 2 is a functional block diagram of a wireless communication device in accordance with some embodiments of the present invention. Wireless communication device 200 may be suitable for use as access point 102 (FIG. 1) and/or one or more of communication stations 104 (FIG. 1). Wireless communication device 200 includes media-access control (MAC) layer circuitry 202, physical (PHY) layer circuitry 204, and one or more antennas 206, the operations of which are described in more detail below. Antennas 206 may correspond to one or more of antennas 106 (FIG. 1).

In some embodiments, referred to as multiple-input, multiple output (MIMO) embodiments, wireless communication device 200 may use more than one antenna 206 allowing the device 200 to take advantage of the spatial diversity of the antennas to allow the communication of more than one spatial data stream on the same frequency subcarriers. This is described in more detail below.

Although wireless communication device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of wireless communication device 200 may refer to one or more processes operating on one or more processing elements.

Figure 3:
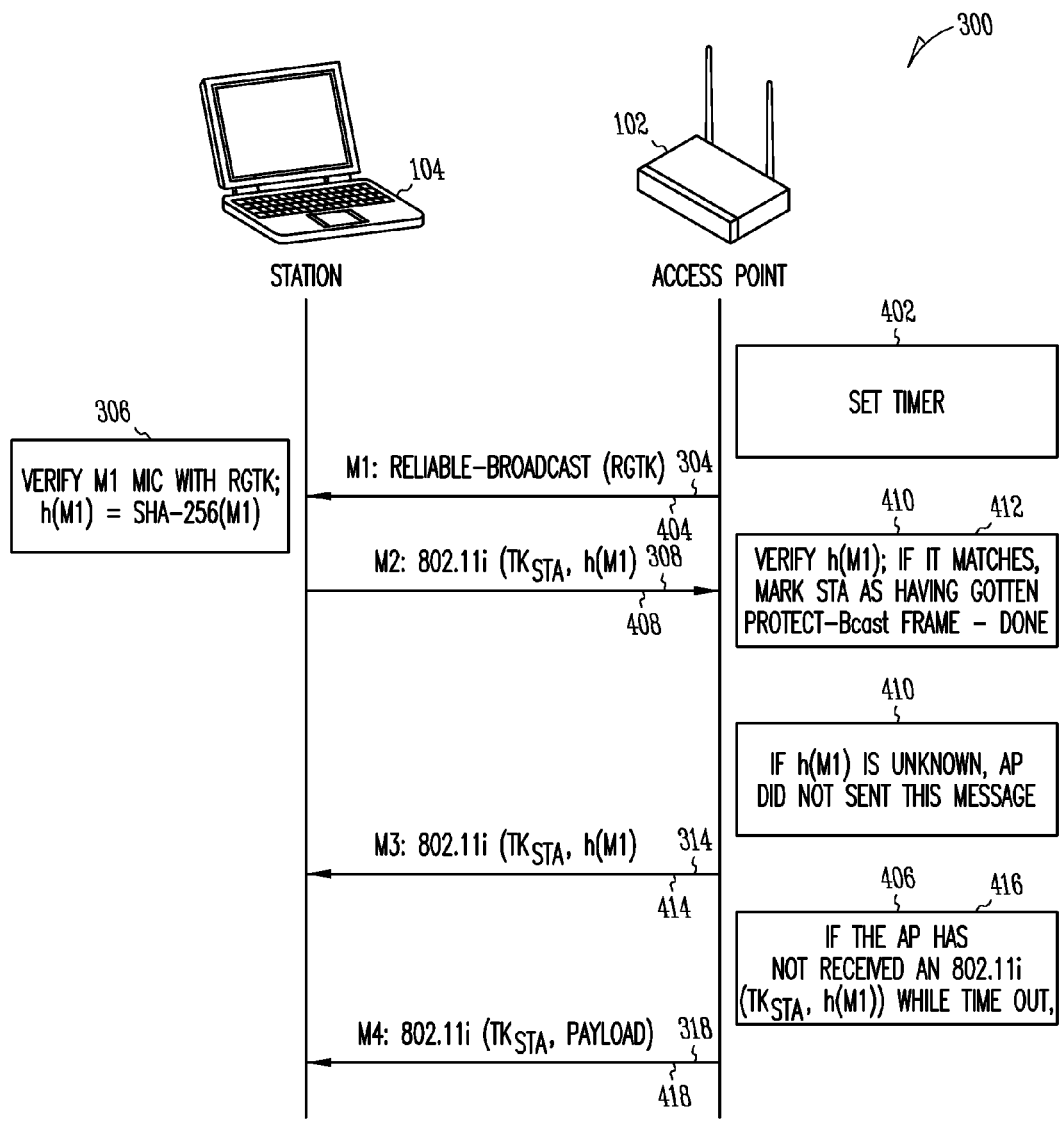
FIG. 3 is a diagram of an example of a communications flow in accordance with some embodiments of the present invention.

FIG. 3 is a diagram of an example of a communications flow in accordance with some embodiments of the present invention. Communications flow 300 may be performed by access point 102 (FIG. 1) and one of communication stations 104 (FIG. 1) as illustrated. The 400 level reference numbers illustrated in FIG. 3 correspond to operations described below in FIG. 4.

In some embodiments, access point 102 may transmit broadcast message 304 (M1) to one or more associated communication stations 104. The broadcast message may be secured (e.g., encrypted) with a broadcast key. Associated communication stations that receive the broadcast message may authenticate the broadcast message with the broadcast key and may generate reply message 308 (M2). Each reply message 308 may include a hash of broadcast message 304 (illustrated in FIG. 3 as h(M1)) and may be secured (e.g., encrypted) with a session key of the communication station generating reply message 308.

Access point 102 may verify the hash of each reply message 308 received and may transmit countermand message 314 (M3) when the hash received from one of communication stations 104 does not verify. The countermand message may indicate to a particular communication station that the broadcast message received by the station did not originate from access point 102. Countermand message 314 may be secured with a session key ($TK_{STA}$) of the particular communication station.

In accordance with some embodiments, communication stations 104 receiving broadcast message 304 may authenticate the broadcast message by computing a message integrity code (MIC) with the broadcast key. In some embodiments, computing the message integrity code may include computing a cryptographic checksum of the payload of the broadcast message using the broadcast key and comparing the message integrity code to the cryptographic checksum within the broadcast message. The message integrity code may also be referred to as a message authentication code, although the scope of the invention is not limited in this respect. In some embodiments, communication stations 104 receiving broadcast message 304 may verify the broadcast message M1 by performing operation 306. Operation 306 may include using a reliable group temporal key (RGTK) and may include performing a secure hash algorithm (SHA). such as SHA-256 on the broadcast message M1, although the scope of the invention is not limited in this respect.

In accordance with some embodiments, each of communication stations 104 (FIG. 1) associated with access point 102 may have a unique session key for use for securing individual communications with access point 102. In some embodiments, the session keys may be symmetric keys. In these embodiments, individual communications between access point 102 and a particular communication station may be secured by a session key that is unique to the particular communication station. In these embodiments, the transmission of a message secured with a particular communication station's session key may be decrypted only with the station possessing the particular session key. In these embodiments, access point 102 may use a particular communication station's assigned session key for unicasting messages to that particular communication station, although the scope of the invention is not limited in this respect.

In accordance with some embodiments, prior to verifying the hash within reply message 308, access point 102 may decrypt each reply message using the session key of the communication station 104 that had transmitted the reply message. In these embodiments, access point 102 may verify the hash by comparing the hash received in the reply message with a hash of the broadcast message that was initially sent by the access point. A hash failing to validate indicates that the communication station that had transmitted the reply packet received a forged broadcast message. In other words, the hashes sent by communication stations 104 in response to broadcast message 304 should be the same; otherwise the broadcast message was not sent by access point 102 and may have been sent (i.e., forged) by one of the associated communication stations. When the hash does verify, this indicates to access point 102 that the particular communication station had properly received broadcast message 304.

In some embodiments, when access point 102 receives a reply message, access point 102 may determine which session key to use to decrypt the reply message by determining the particular communication station that sent the reply message. The sending station may be identified based on the message's source address for some WLAN and IEEE 802.11 embodiments or on a channel identifier for some WiMax and some IEEE 802.16 embodiments discussed below.

In accordance with some embodiments, when the hash received from one of the communication stations does verify, access point 102 may identify the particular communication station that sent the reply message as having properly received the broadcast message. In other words, the particular communication station did not receive a forged broadcast message.

In accordance with some embodiments, countermand message 314 includes the hash (i.e., the hash that did not verify) that was received from the sending communication station. In countermand message 314, the hash may be secured with the session key of the communication station. In accordance with some embodiments, at least one bit of the payload of countermand message 314 that is transmitted to the communication station is different than the payload of the reply message received from the particular communication station. In some embodiments, the difference between the reply and countermand messages may indicate to the communication station that the communication station had received a forged broadcast message. In other embodiments, the countermand message may include other indicators that indicate to the particular communication station that it had previously received a forged broadcast message.

In some embodiments, access point 102 may send countermand message 314 for any reply messages received by access point 102 when the hash does not verify, independent of whether a broadcast message was actually sent or not. In this way, any broadcast messages that are forged by associated communication stations 104 may be identified.

In accordance with some embodiments, access point 102 may wait a predetermined period of time to receive the reply messages from each of associated communication stations 104 after transmission of broadcast message 304. After the predetermined period of time, access point 102 may transmit retransmit message 318 (M4) that includes at least the payload of broadcast message 304. Retransmit message 318 may be sent in a unicast fashion to each communication station 104 from which a reply message was not received. In some embodiments, each retransmit message 318 may be secured with a session key for the associated communication station 104 from which a reply message was not received. In some embodiments, the predetermined period of time may range from 50 to 250 milliseconds, although the scope of the invention is not limited in this respect.

In accordance with some embodiments, the broadcast key is known to associated communication stations 104 and is provided by access point 102 to the associated communication stations 104 at session startup. In these embodiments, a session key is also provided to each of associated communication stations 104 at session startup. The broadcast key and session keys may be rotated and replaced on a regular basis. In accordance with some embodiments, the broadcast key may be a group temporal key (GTK) discussed in more detail below. In some embodiments, the session keys may be pairwise temporal keys. Each session key may be used to secure communications between one associated communication station 104 and access point 102. In some embodiments, broadcast key 304 may be referred to as a reliable group temporal key (RGTK), although the scope of the invention is not limited in this respect.

In accordance with some embodiments, broadcast message 304 comprises a management frame or packet and requests all the associated communication stations 104 to perform an action. In accordance with some other embodiments, broadcast message 304 comprises a network management control message. Although some embodiments describe the broadcast messages as network control messages, the scope of the invention is not limited in this respect. The broadcast message may include any message that is sent to more than one communication station including multicast messages and messages that include data packets as well as control packets. As used herein, a broadcast message may comprise a multicast message, although the scope of the invention is not limited in this respect.

In accordance with some embodiments, broadcast message 304 requests associated communication stations 104 to perform one or more actions. The actions may include measuring the communication station's individual signal environment, directing the communication stations to switch to another channel, and/or directing the communication stations to perform a network management operation, as well as other requested actions. In accordance with some embodiments, when broadcast message 304 requests associated communication stations 104 to perform an action, each of the associated communication stations 104 that receive broadcast message 304 may begin performing the requested action (i.e., at least begin to process the payload of the broadcast message) unless or until the communication station receives countermand message 318 indicating that the broadcast message was not sent by access point 102. In these embodiments, a communication station may terminate the performance of the requested action in response to receipt of the countermand message. In these embodiments, a communication station may perform the action requested by the broadcast message whether or not the station knows if the message has been forged. In these embodiments, a communication station receiving a forged broadcast message may actually end up performing the requested action until it receives the countermand message.

In accordance with some embodiments, broadcast message 304 sent by access point 102 and the reply messages sent by communication stations 104 may be transmitted on orthogonal frequency division multiplexed (OFDM) communication signals 108 (FIG. 1) comprising a plurality of substantially orthogonal subcarriers, although the scope of the invention is not limited in this respect. In some embodiments, the OFDM communication signals may be transmitted in accordance with the IEEE 802.11(a) or (g) standards discussed below, although the scope of the invention is not limited in this respect.

In accordance with some other embodiments, broadcast message 304 sent by access point 102 and the reply messages sent by communication stations 104 may be transmitted on spread-spectrum modulated communication signals, although the scope of the invention is not limited in this respect. In these embodiments, bits may be modulated with a Barker code chipping sequence to generate the spread-spectrum signals. In some of these embodiments, the spread-spectrum modulated communication signals may be transmitted in accordance with the IEEE 802.11(b) standard discussed below, although the scope of the invention is not limited in this respect.

In accordance with some MIMO embodiments, broadcast message 304 may be transmitted using more than one antenna 206, and/or the reply messages received from the communication stations may be received by access point 102 with more than one antenna 206. In these embodiments, broadcast message 304 may be sent by access point 102 and the reply messages sent by communication stations 104 may be transmitted on either spread-spectrum modulated communication signals or OFDM communication signals 108. In some of these embodiments, the access point may have separate receive and transmit antennas, while in other embodiments, the access point may use a single set of antennas for both receiving and transmitting. In some of these MIMO embodiments, the communication signals transmitted and received by access point 102 and/or communication stations 104 may be in accordance with the IEEE 802.11 standards referenced below, although the scope of the invention is not limited in this respect.

Referring back to FIG. 2, physical layer circuitry 204 may be configured to transmit broadcast message 304 to one or more associated communication stations 104, and media access control layer circuitry 202 may be configured to perform operations including verifying the hash of each reply message 308 received by access point 102 (e.g., shown as operation 410 in FIG. 3). Physical layer circuitry 204 may also be configured to transmit the countermand message 314 when the hash received from one of the communication stations 104 does not verify. Media access control layer circuitry 202 may secure countermand message 314 with the session key of the communication station. The combination of physical layer circuitry 204 and media access control layer circuitry 202 may together perform any of the operations described herein.

As mentioned above, in some embodiments, wireless communication device 200 may communicate OFDM communication signals over a multicarrier communication channel that may be within a predetermined frequency spectrum and may comprise a plurality of orthogonal subcarriers. In some embodiments, the orthogonal subcarriers may be closely spaced OFDM subcarriers. To help achieve orthogonality between the closely spaced subcarriers, each subcarrier may have a null at substantially a center frequency of the other subcarriers. In some embodiments, to help achieve orthogonality between the closely spaced subcarriers, each subcarrier may have an integer number of cycles within a symbol period, although the scope of the invention is not limited in this respect.

In some embodiments, wireless communication device 200 may be part of a wireless access point, such as a Wireless Fidelity (WiFi), Worldwide Interoperability for Microwave Access (WiMax), or broadband communication station, although the scope of the invention is not limited in this respect. In some embodiments, wireless communication device 200 may a portable wireless communication device, such as personal digital assistant (PDA), a laptop or portable computer with wireless communication capability, a web tablet, a wireless telephone, a wireless headset, a pager, an instant messaging device, a digital camera, an access point, a television or other device that may receive and/or transmit information wirelessly. In some embodiments, physical layer circuitry 204 and MAC layer circuitry 202 of wireless communication device 200 may comprise a network interface card (NIC), although the scope of the invention is not limited in this respect.

In some embodiments, the frequency spectrums for the multicarrier communication signals communicated by wireless communication device 200 may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some broadband and WiMax embodiments, the frequency spectrum for communications may comprise frequencies between 2 and 11 GHz, although the scope of the invention is not limited in this respect.

In some embodiments, wireless communication device 200 may communicate radio-frequency (RF) communications in accordance with specific communication standards, such as the Institute of Electrical and Electronics Engineers (IEEE) standards including IEEE 802.11(a), 802.11(b) and/or 802.11(g) standards for wireless local area networks (WLANs), although wireless communication device 200 may also be suitable to transmit and/or receive communications in accordance with other techniques including the Digital Video Broadcasting Terrestrial (DVB-T) broadcasting standard, and the High performance radio Local Area Network (HiperLAN) standard. In some broadband and WiMax embodiments, wireless communication device 200 may communicate broadband wireless communications in accordance with the IEEE 802.16 standards for wireless metropolitan area networks (WMANs). For more information with respect to IEEE 802.11 standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related amendments/versions.

Antennas 206 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used.

Figure 4:
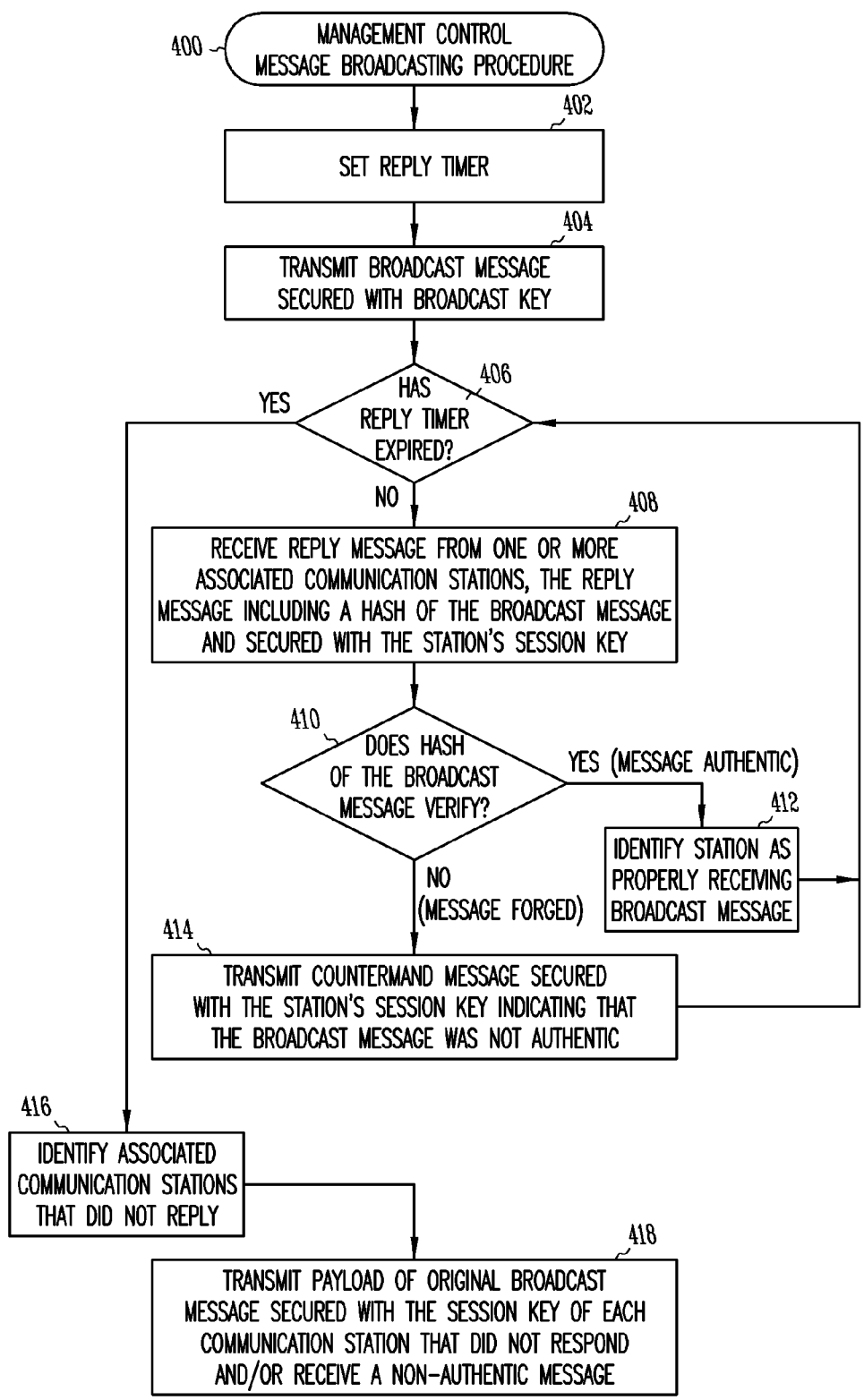
FIG. 4 is a flow chart of management control message broadcasting procedure in accordance with some embodiments of the present invention.

FIG. 4 is a flow chart of management control message broadcasting procedure in accordance with some embodiments of the present invention. Procedure 400 may be performed by a managing communication station, such as access point 102 (FIG. 1), as part of its operations within a wireless network.

In operation 402, the access point sets the reply timer and in operation 404, the access point transmits broadcast message 304 (FIG. 3). In operation 406, the access point determines whether or not the reply timer has expired. When the reply timer has not expired, operation 408 is performed.

In operation 408, the access point receives reply messages, such as reply message 308 (FIG. 3), from one or more of the associated communication stations. The reply messages may include a hash of the broadcast message transmitted in operation 402 and may be secured with the session key of the communication station that transmitted the reply message.

In operation 410, the access point may decrypt the reply messages with the proper session key and may verify that hash within the reply message matches the hash of the originally sent broadcast message. When the hash verifies (i.e., matches), the broadcast message received by the particular communication station was authentic and operation 412 is performed. In operation 412, the access point may identify the station as properly received the broadcast message.

Operation 414 is performed when the hash does not verify indicating that the broadcast message received by the particular communication station was forged. In operation 414, the access point transmits countermand message 314 (FIG. 3) to indicate that the broadcast message was not authentic.

It should be noted that in response to receipt of a broadcast message transmitted in operation 404, the associated communication stations that receive the broadcast message may begin processing the broadcast message by performing any commands indicated in the broadcast message. In these embodiments, each associated communication stations will continue to process the broadcast message until it receives the countermand message transmitted in operation 414, at which time the particular communication station may discontinue processing the broadcast message.

Operation 416 is performed when the reply timer has expired, as determined in operation 406. Operation 416 comprises identifying stations that did not reply with a reply message within the time period of the timer. In some embodiments, the stations identified in operation 412 may be compared with a list of all the associated communication stations.

In operation 418, the access point transmits a retransmission message 318 (FIG. 3) which may comprise the payload of the original broadcast message that was transmitted in operation 404 secured with the session key of the stations that did not reply identified in operation 416.

In some embodiments, operation 418 may further include the access point transmitting retransmission message 318 (FIG. 3) to a station that received a forged broadcast message after the transmission of the countermand message in operation 414. This may be done before the expiration of the reply timer.

Although the individual operations of procedure 400 are illustrated and described as separate operations, one or more of the individual operations may be performed concurrently, and nothing requires that the operations be performed in the order illustrated.

Referring back to FIG. 1, in some embodiments, network 100 may relate to the IEEE 802.11(w), IEEE 802.11(i), IEEE 802.11(k), IEEE 802.11(r), IEEE 802.11(s), and IEEE 802.11(v) proposed standards for wireless security and management frame protection, although the scope of the invention is not limited in this respect. In these embodiments, network 100 may implement a mechanism that protects broadcast and multicast message from insider forgery attacks against the IEEE 802.11(i) Group Temporal Key (GTK). Embodiments may also be applied to 802.11 data messages (including, for example, all traffic classes and traffic types) as well as management frames that are widely used in IEEE 802.11 compliant networks. Some embodiments may be deployed within mobile computing platforms and handheld devices to enhance wireless network security and secure wireless network manageability.

A broadcast and multicast action frame (e.g., one of the IEEE 802.11 management frames) may be used to request for radio resource measurement, network information, and network optimization control in the IEEE 802.11 amendments 11(k), 11(h), and 11(v) mentioned above. These management frames generally contain valuable radio resource requirement and network information and are subject to forgery. The consequences of a forged request vary depending on the implementation of the receiving communication station. For instance, a receiving communication station may reject additional requests which allow forgeries to presents a denial of service opportunity. Similarly, if the receiving communication station queues pending requests while performing a measurement, then any physical realization will have a finite queue length, and an attacker might be able to create a denial-of-service by filling the queue with forged requests. As another example, a forged network management control message can lead to poorer performance than by ignoring valid messages. In addition, forged message requests with incorrect parameters can lead to power consuming activities by the receiving communication station.

In accordance with some embodiments, the broadcast and multicast data protection scheme defined in IEEE 802.11(i) may be extended to protect broadcast and multicast management frames. Some embodiments of the present invention define a protection scheme to protect broadcast and multicast data and management frame from outsider forgery as well as insider forgery.

In accordance with some embodiments, each communication station receives a reliable broadcast message (e.g., M1) and responds with reply message (e.g., M2), which indicates the broadcast message received by the communication station by including the hash of the broadcast message (e.g., h(M1)). When the access point receives M2, it may determine whether it recently sent message M1. If not, the access point may advise the station with a countermand message (e.g., M3) that message M1 was a forgery. By assumption, the forged M1 could only be produced by an insider (e.g., one of the associated communication stations). On the other hand, if the access point never receives a response from some of the stations, the access point may resend the payload of the original broadcast message in a retransmit message (e.g., M4). In some embodiments, messages M2, M3, and M4 may be protected using the 802.11(i) protection scheme, although the scope of the invention is not limited in this respect.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A method for broadcasting messages comprising:
    transmitting a broadcast message by an access point to one or more associated communication stations, the broadcast message being secured with a broadcast key, the associated communication stations that receive the broadcast message are to authenticate the broadcast message with the broadcast key and are to generate a reply message, each reply message including a hash of the broadcast message secured with a session key of the communication station that generated the reply message;
    verifying the hash of the broadcast message in each reply message received at the access point; and
    transmitting a countermand message when the hash received from one of the communication stations does not verify, the countermand message indicating to the one communication station that the broadcast message did not originate from the access point, the countermand message being secured with a session key of the one communication station.

2. The method of claim 1 wherein the communication stations receiving the broadcast message authenticate the broadcast message by computing a message integrity code with the broadcast key.

3. The method of claim 1 wherein the method is performed by the access point in a wireless local area network that includes a plurality of communication stations, wherein each of the communication stations associated with the access point has a unique session key for use in securing individual communications with the access point.

4. The method of claim 3 further comprising prior to verifying the hash, decrypting, at the access point, each reply message using the session key of the communication station that had transmitted the reply message,
    wherein verifying the hash comprises comparing the hash received in the reply message with a hash of the broadcast message that was initially sent by the access point, and
    wherein a hash of a broadcast message failing to validate indicates that the communication station that had transmitted the reply packet received a forged broadcast message.

5. The method of claim 4 wherein when the hash received by one of the communication stations does verify, the method includes the access point identifying the one communication station as having actually received the broadcast message.

6. The method of claim 4 wherein the countermand message includes the hash that was received from the one communication station, the hash being secured with the session key of the one communication station.

7. The method of claim 6 wherein at least one bit of the payload of the countermand message transmitted to the one communication station is different than the payload of the reply message received from the one communication station, the difference between the messages indicating to the one communication station that the one communication received the forged broadcast message.

8. The method of claim 3 further comprising:
    waiting a predetermined period of time to receive the reply message from each of the communication stations after transmission of the broadcast message; and
    after the predetermined period of time, transmitting a retransmit message comprising at least a payload of the broadcast message in a unicast fashion to each communication station from which a reply message was not received,
    wherein each of the retransmit messages are secured with a session key for an associated one of the communication stations from which a reply message was not received.

9. The method of claim 3 wherein the broadcast key is known to the associated communication stations, and
    wherein the method further comprises:
    providing the broadcast key to the associated communication stations at session startup; and providing one of the session keys to each of the associated communication stations at session startup.

10. The method of claim 9 wherein the broadcast key is a group temporal key, and
wherein the session keys are pairwise temporal keys, each session key used to secure communications between one associated communication station and the access point.

11. The method of claim 3 wherein the broadcast message comprises a management frame and requests the associated communication stations to perform an action.

12. The method of claim 3 wherein the broadcast message comprises a network management control message.

13. The method of claim 12 wherein the broadcast message requests the associated communication stations to perform one or more actions comprising one of measuring the communication station's signal environment, directing the communication stations to switch to another channel, and directing the communication stations to perform a network management operation.

14. The method of claim 12 wherein the broadcast message requests the associated communication stations to perform an action, and
wherein each of the associated communication stations that receive the broadcast message begin performing the requested action either unless or until the communication station receives a countermand message secured by the station's session key,
wherein the one communication station terminates the performance of the requested action in response to receipt of the countermand message.

15. The method of claim 3 wherein the broadcast message sent by the access point and the reply messages sent by the communication stations are transmitted on orthogonal frequency division multiplexed communication signals comprising a plurality of substantially orthogonal subcarriers.

16. The method of claim 3 wherein the broadcast message sent by the access point and the reply messages sent by the communication stations are transmitted on spread-spectrum modulated communication signals.

17. The method of claim 3 wherein the broadcast message sent by the access point is transmitted using more than one antenna,
wherein the reply messages received from the communication stations are received by the access point with more than one antenna, and
wherein the broadcast message sent by the access point and the reply messages sent by the communication stations are transmitted on either spread-spectrum modulated communication signals or orthogonal frequency division multiplexed communication signals.

18. An access point comprising:
physical layer circuitry to transmit a broadcast message to one or more associated communication stations, the broadcast message being secured with a broadcast key, the associated communication stations that receive the broadcast message are to authenticate the broadcast message with the broadcast key and are to generate a reply message, each reply message including a hash of the broadcast message secured with a session key of the communication station that generated the reply message; and
media access control layer circuitry to verify the hash of the broadcast message in each reply message received by the access point,
wherein the physical layer circuitry is to transmit a countermand message when the hash received from one of the communication stations does not verify, the countermand message indicating to the one communication station that the broadcast message did not originate from the access point, the countermand message being secured with a session key of the one communication station.

19. The access point of claim 18 wherein the access point operates a wireless local area network that includes a plurality of communication stations, wherein each of the communication stations associated with the access point has a unique session key for use for securing individual communications with the access point.

20. The access point of claim 19 wherein the media access control layer circuitry decrypts each reply message using the session key of the communication station that had transmitted the reply message,
wherein the media access control layer circuitry verifies the hash received in the reply message by comparison with a hash of the broadcast message that was initially sent by the access point, and
wherein a hash of a broadcast message failing to validate indicates that the communication station that had transmitted the reply packet received a forged broadcast message.

21. The access point of claim 20 wherein the media access control layer circuitry generates the countermand message to include the hash that was received from the one communication station, the hash being secured with the session key of the one communication station, and
wherein at least one bit of the payload of the countermand message is different than the payload of the reply message received from the one communication station, the difference between the messages indicating to the one communication station that the one communication received the forged broadcast message.

22. The access point of claim 20 wherein the media access control circuitry waits a predetermined period of time to receive the reply message from each of the communication stations after transmission of the broadcast message,
wherein after the predetermined period of time, the physical layer circuitry is configured to transmit a retransmit message comprising at least a payload of the broadcast message in a unicast fashion to each communication station from which a reply message was not received, and
wherein each of the retransmit messages are secured with a session key for an associated one of the communication stations from which a reply message was not received.

23. A method of receiving broadcasted messages comprising:
receiving a broadcast message from an access point at a communication station, the broadcast message being secured with a broadcast key;
authenticating the broadcast message with the broadcast key and generating a reply message, the reply message including a hash of the broadcast message secured with a session key of the communication station, the access point to verify the hash of the broadcast message in the reply message; and
receiving a countermand message when the hash generated by the communication station does not verify by the access point, the countermand message indicating to the communication station that the broadcast message did not originate from the access point, the countermand message being secured by the access point with the session key.

24. The method of claim 23 wherein the method is performed by the wireless communication station operating in a wireless local area network that includes a plurality of communication stations and the access point, and wherein each of the communication stations associated with the access point has a unique session key for use for securing individual communications with the access point.

25. The method of claim 23 wherein prior to the access point verifying the hash within the reply message, the access point decrypts the reply message using the session key of the communication station, wherein the access point verifies the hash by comparing the hash received in the reply message with a hash of the broadcast message that was initially sent to the communication station, and wherein a hash of a broadcast message failing to validate indicates that the communication station received a forged broadcast message.

26. The method of claim 25 wherein the countermand message includes the hash that was received from the communication station, the hash being secured with the session key of the communication station, wherein at least one bit of the payload of the countermand message transmitted to the communication station is different than the payload of the reply message received from the communication station, the difference between the messages indicating to the communication station that the communication received a forged broadcast message, and wherein the method further comprises the communication station receiving the countermand message, decrypting the countermand message with the session key, and comparing the countermand message with the reply message.

27. The method of claim 23 wherein the access point waits a predetermined period of time to receive the reply message from the communication station after transmission of the broadcast message, after the predetermined period of time, the access point transmits a retransmit message comprising at least a payload of the broadcast message in a unicast fashion to the communication station when the reply message was not received, wherein the retransmit message is secured with the session key for the communication station.

28. A communication station comprising:

physical layer circuitry to receive a broadcast message from an access point, the broadcast message being secured with a broadcast key; and media access control circuitry to authenticate the broadcast message with the broadcast key and generate a reply message, the reply message including a hash of the broadcast message secured with a session key of the communication station, the access point to verify the hash of the broadcast message in the reply message, wherein the physical layer circuitry is to receive a countermand message transmitted by the access point when the hash generated by the communication station does not verify at the access point, the countermand message indicating to the communication station that the broadcast message did not originate from the access point, the countermand message being secured by the access point with the session key.

29. The communication station of claim 28 wherein the communication station operates in a wireless local area network that includes a plurality of communication stations and the access point, wherein each of the communication stations associated with the access point has a unique session key for use for securing individual communications with the access point.

30. The communication station of claim 28 wherein prior to the access point verifying the hash of the reply message, the access point decrypts the reply message using the session key of the communication station, wherein the access point verifies the hash by comparing the hash received in the reply message with a hash of the broadcast message that was initially sent to the communication station, and wherein a hash of the broadcast message failing to validate indicates that the communication station received a forged broadcast message.

31. The communication station of claim 30 wherein the countermand message includes the hash that was received from the communication station, the hash being secured with the session key of the communication station, wherein at least one bit of the payload of the countermand message transmitted to the communication station is different than the payload of the reply message received from the communication station, the difference between the messages indicating to the communication station that the communication received the forged broadcast message, wherein the communication station receives the countermand message, decrypts the countermand message with the session key, and compares the countermand message with the reply message.

32. The communication station of claim 28 wherein the access point waits a predetermined period of time to receive the reply message from the communication station after transmission of the broadcast message, wherein after the predetermined period of time, the access point transmits a retransmit message to the communication station, the retransmit message comprising at least a payload of the broadcast message in a unicast fashion to the communication station, and wherein the retransmit message is secured with the session key for the communication station.

33. A system comprising:

one or more antennas;

physical layer circuitry to transmit a broadcast message to one or more associated communication stations using the antennas, the broadcast message being secured with a broadcast key, the associated communication stations that receive the broadcast message are to authenticate the broadcast message with the broadcast key and are to generate a reply message, each reply message including a hash of the broadcast message secured with a session key of the communication station generating the reply message; and media access control layer circuitry to verify the hash of the broadcast message in each reply message received by the system, wherein the physical layer circuitry is to transmit a countermand message when the hash received from one of the communication stations does not verify, the countermand message indicating to the one communication station that the broadcast message did not originate from the system, the countermand message being secured with a session key of the one communication station.

34. The system of claim 33 wherein the system operates a wireless local area network that includes a plurality of communication stations, wherein each of the communication stations associated with the system has a unique session key for use for securing individual communications with the system.

35. The system of claim 33 wherein the media access control layer circuitry decrypts each reply message using the session key of the communication station that had transmitted the reply message, wherein the media access control layer circuitry verifies the hash received in the reply message by comparison with a hash of the broadcast message that was initially sent by the system, and wherein a hash of a broadcast message failing to validate indicates that the communication station that had transmitted the reply packet received a forged broadcast message.

* * * * *